(12) United States Patent
Grosseholz et al.

(10) Patent No.: US 11,549,487 B2
(45) Date of Patent: Jan. 10, 2023

(54) METHOD FOR OPERATING A WIND FARM HAVING A PLURALITY OF WIND TURBINES AND CORRESPONDING WIND FARM

(71) Applicant: Nordex Energy SE & Co. KG, Hamburg (DE)

(72) Inventors: Georg Grosseholz, Hamburg (DE); Mark Jurkat, Norderstedt (DE)

(73) Assignee: Nordex Energy SE & Co. KG, Hamburg (DE)

( * ) Notice: Subject to any disclaimer, the term of this patent is extended or adjusted under 35 U.S.C. 154(b) by 51 days.

(21) Appl. No.: 17/145,004

(22) Filed: Jan. 8, 2021

(65) Prior Publication Data
US 2021/0215136 A1   Jul. 15, 2021

(30) Foreign Application Priority Data
Jan. 9, 2020 (EP) ..................... 20150972

(51) Int. Cl.
*F03D 7/04* (2006.01)
*F03D 7/02* (2006.01)

(52) U.S. Cl.
CPC ......... *F03D 7/0284* (2013.01); *F03D 7/0264* (2013.01); *F03D 7/048* (2013.01); *F05B 2270/1033* (2013.01); *F05B 2270/335* (2013.01)

(58) Field of Classification Search
None
See application file for complete search history.

(56) References Cited

U.S. PATENT DOCUMENTS

| 7,756,609 | B2 | 7/2010 | Jurkat et al. | |
| 8,736,093 | B2 | 5/2014 | Kii et al. | |
| 9,515,486 | B2 | 12/2016 | Yasugi et al. | |
| 9,556,852 | B2 | 1/2017 | Babazadeh et al. | |
| 2002/0190695 | A1* | 12/2002 | Wall | H02J 1/14 322/17 |
| 2009/0055030 | A1* | 2/2009 | Mayor | H02J 3/472 700/287 |
| 2011/0166717 | A1* | 7/2011 | Yasugi | F03D 7/047 290/44 |

(Continued)

FOREIGN PATENT DOCUMENTS

| EP | 2028368 A2 | 2/2009 |
| EP | 2757250 A1 | 7/2014 |

(Continued)

*Primary Examiner* — Michael Lebentritt
(74) *Attorney, Agent, or Firm* — Walter Ottesen, P.A.

(57) ABSTRACT

A method for operating a wind farm having a plurality of wind turbines, each of which is assigned a minimum power limit (CMPLj), wherein a power setpoint value (SPP) for a power which is to be fed in is specified for the wind farm, in dependence on which power setpoint value (SPP), individual wind turbines are activated or shut down, wherein the activation or shut-down of one or more wind turbines in the wind farm takes place in dependence on the respectively assigned minimum power limits (CMPLj), wherein each wind turbine of the wind farm is assigned a current value for its minimum power limit, and wherein the value takes into account variable operating conditions and/or ambient conditions of the respective wind turbine.

17 Claims, 5 Drawing Sheets

(56) References Cited

U.S. PATENT DOCUMENTS

| | | | | |
|---|---|---|---|---|
| 2012/0133138 | A1* | 5/2012 | Sorensen | H02J 3/46 290/44 |
| 2014/0225370 | A1* | 8/2014 | Mayer | H02J 3/48 290/44 |
| 2016/0333852 | A1* | 11/2016 | Busker | H02J 3/381 |
| 2016/0336888 | A1* | 11/2016 | Busker | F03D 9/257 |
| 2017/0022977 | A1* | 1/2017 | Garcia | H02J 3/18 |
| 2017/0192445 | A1* | 7/2017 | Dennis | H02J 3/382 |
| 2018/0195493 | A1 | 7/2018 | Garcia et al. | |
| 2020/0200146 | A1* | 6/2020 | Von Aswege | F03D 7/045 |
| 2020/0392945 | A1* | 12/2020 | Grosseholz | F03D 7/048 |
| 2021/0040936 | A1* | 2/2021 | Busker | F03D 7/048 |
| 2021/0254599 | A1* | 8/2021 | Kjergaard | F03D 7/048 |
| 2021/0265841 | A1* | 8/2021 | Brombach | H02J 3/16 |

FOREIGN PATENT DOCUMENTS

| | | |
|---|---|---|
| EP | 2824322 A1 | 1/2015 |
| EP | 2896102 A1 | 7/2015 |
| EP | 3570401 A1 | 11/2019 |
| WO | 2010028954 A2 | 3/2010 |

* cited by examiner

METHOD FOR OPERATING A WIND FARM HAVING A PLURALITY OF WIND TURBINES AND CORRESPONDING WIND FARM

CROSS REFERENCE TO RELATED APPLICATION

This application claims priority of European patent application no. 20 150 972.8, filed Jan. 9, 2020, the entire content of which is incorporated herein by reference.

FIELD OF THE INVENTION

The present disclosure relates to a method for operating a wind farm having a plurality of wind turbines and to a wind farm. In the disclosure, an active power setpoint value for the active power, which is to be fed in, is specified for the wind farm, the specification can be made from the outside, for example, by a power grid operator or on the basis of a power grid variable, which is detected at the point linking the wind farm to the power grid, and follows a control rule which is specified in the wind farm control. For example, the active power setpoint value can be specified on the basis of the power grid frequency, the power grid voltage and/or the reactive power which is output by the wind farm.

BACKGROUND OF THE INVENTION

It is basically known to limit the active power which is output overall by a wind farm by specifying a setpoint value. This can be necessary, for example, if the consumers which are connected to the power grid request less power than that which is available. Such throttled operation of the wind farm makes it necessary also to provide a throttled operating mode at least for some of the wind turbines in the wind farm, to shut down some of the wind turbines completely and/or at least to withdraw the production permit from them. Different methods for controlling the power output of a wind farm are known, for example from WO 2010/028954 A2; U.S. Pat. No. 9,566,852; 8,736,093; or, 9,515,486.

U.S. Pat. No. 7,756,609 has disclosed a method for operating a wind farm in which a superordinate controller determines each setpoint value for the individual wind turbines in dependence on a currently maximum possible value which the wind turbine can generate. Therefore, the total amount which can be provided by the wind farm is distributed in dependence on the contribution which each individual wind turbine can currently make. In order to determine the setpoint value, in this context the maximum possible value of the wind farm is divided by the number of wind turbines in the wind farm and weighted with the quotient of the currently maximum possible value of the respective wind turbine and the mean value of the currently maximum possible values of all the wind turbines in the wind farm. In this method, individual wind turbines can be assigned as setpoint value which is below the value at which the wind turbine can be continuously operated. As a result, such turbines may be shut down, as a result of which the power output of the wind farm changes. If the setpoint value which is specified for the wind farm cannot be reached by the turbines which remain in operation, this can bring about activation of a further wind turbine which has possibly only just been shut down. Depending on the degree of limitation and the present operating conditions, the method can lead to frequent shut-down processes of wind turbines. In addition, this results in continuously changing setpoint values for each of the wind turbines within the wind farm, which under unfavorable wind conditions can cause the wind turbines to experience coupled oscillation. Frequent shut-down and activation processes can also lead to increased wear of the wind turbines. In addition, the shut-down of wind turbines causes the power range which can be supplied by the wind farm within a short time to be limited, since renewed starting of a turbine can take several minutes, depending on the prevailing wind conditions. Since it is to be expected that the increasing penetration of wind turbines into power grids will make limited operation the rule, there is a need for an improved method for distributing setpoint values in a limited operating mode.

SUMMARY OF THE INVENTION

It is an object of the invention to provide a method for operating a wind farm which controls the power output of the individual wind turbines in the wind farm in a more efficient and reliable fashion.

The above mentioned object can, for example, be achieved via a method for operating a wind farm having a plurality of wind turbines, each of which is assigned a minimum power limit, the method comprising: specifying a power setpoint value for a power which is to be fed in for the wind farm; assigning each wind turbine of the wind farm a current value for its minimum power limit, wherein the current value takes into account at least one of variable operating conditions and ambient conditions of the respective wind turbine; and, activating or shutting down one or more individual ones of the plurality of wind turbines in dependence on the power setpoint value, wherein the activating and shutting-down of one or more wind turbines in the wind farm takes place in dependence on the respectively assigned minimum power limits. The object can, for example, further be achieved via a wind farm comprising: a plurality of wind turbines, wherein a minimum power limit is specified for each of the plurality of wind turbines; a central control unit configured to have a power setpoint value of power which is to be fed in specified; and, the control unit being configured to activate or shut down the wind turbines in dependence on the power setpoint value and in dependence on the minimum power limits of the wind turbines, wherein each of the plurality of wind turbines of the wind farm is assigned a current value for its minimum power limit, wherein the current value takes into account at least one of operating conditions and ambient conditions of the respective wind turbine in a variable fashion.

The method serves to operate a wind farm with a plurality of wind turbines, each of which is allocated a minimum power limit. A power setpoint value of the power which is to be fed in is specified for the wind farm, and individual wind turbines are activated and shut down in dependence on the value. The activation and shut-down of wind turbines in the wind farm occurs only for such wind turbines whose actual operating state permits activation and shut-down. The method specifies prioritization of the turbines which are to be activated and shut down with respect to the other turbines in the wind farm. The prioritization is made in dependence on a minimum power limit which is assigned to the wind turbines. Wind turbines can be operated continuously at a power output level above the minimum power limit. The prioritization of the wind turbines in dependence on their respective minimum power limit ensures that the operating wind turbines in the wind farm are controlled reliably during their operation.

According to the disclosure, each of the wind turbines is assigned a current value for their minimum power limit. This means that the wind turbines are not only assigned the minimum power limit statically owing to their configuration and technical implementation but also that the value can also be specified in a variable fashion while taking into account the operating conditions and/or ambient conditions of the respective wind turbine. Structural limitations can preferably also be taken into account in the case of a variable specification.

Preferably, from a set of wind turbines of the wind farm which are activated, that wind turbine which has a high value for its minimum power limit relative to the other wind turbines can be shut down first. Correspondingly, from the set of wind turbines of the wind farm which are not activated but can be activated, that wind turbine which has a low value for its minimum power limit relative to the other wind turbines can be activated first. In the following, the designation of a wind turbine as being able to be activated implies that the turbine is not activated but could be activated. In both criteria the wind turbine is prioritized in dependence on the minimum power limit. Both approaches also have in common the fact that the highest possible level of controllability is provided for the wind farm. For this purpose, wind turbines which have a high minimum power limit are shut down first. Depending on the prevailing wind conditions, there is a relatively high probability that these turbines cannot be operated reliably and in a continuously stable fashion at power values below their minimum power limit, and as a result of their relatively great limitation they limit the control range for the power output of the wind farm to a greater extent than other wind turbines with a smaller minimum power limit. In this respect, wind turbines with high values for their minimum power limit are preferred in the case of shut-down, while in the case of activation wind turbines with low values for their minimum power limit are preferred. The likewise desirable effect that the control range of the wind farm can be increased and therefore also the dynamics of the control improved is also achieved with this.

The minimum power limit is preferably a minimum active power value of the wind turbine, which value can model a plurality of aspects of the wind turbine. For example, the minimum power limit can depend on the configuration of the wind turbine in terms of its structural configuration. The minimum power limit can also depend, for example, on the constraints for the operation of a main bearing and/or a transmission bearing of the wind turbine, which should not be overloaded by an unfavorable ratio of torque and rotational speed. Since the rotational speed and torque cannot be set in any desired way for each power setpoint, the specification of a minimum power limit protects the components of the wind turbine against excessive wear. Other criteria, such as for example the flow behavior at the locations of the wind turbines in the farm, the wind direction, fluctuations in the wind speed and/or fluctuations in the power setpoint value of the wind farm can also be included in order to specify a minimum power limit for the wind turbine. The minimum power limit of a wind turbine basically defines that the wind turbine can be operated continuously and also possibly with a low load for power values above the minimum power limit. In the case of power values below the minimum power limit, it may be the case that no reliable or stable operation of the wind turbine is possible or individual components of the wind turbine are stressed disproportionately. When specifying the minimum power limit it is also possible to take into account power grid variables such as the power grid voltage or the power grid frequency. The minimum power limit can be changed, for example, in proportion to a deviation of a power grid variable from its nominal value. A non-linear relationship is also conceivable. A hysteresis or a dead band could also be considered.

In an embodiment, additional criteria are defined for the activation and shut-down of wind turbines. It is provided as a basic criterion that a comparison with the other wind turbines which respectively have the largest or smallest minimum power limit relative to the other wind turbines defines the wind turbine which is to be shut down or activated. In a case in which the basic criteria do not unambiguously define a wind turbine which is to be activated or shut down, the additional criteria serve to define, via the additional criteria, which wind turbine of the set of wind turbines which are to be preferably shut down or activated according to the basic criteria is to be activated or shut down. For the wind turbine which is to be shut down there can be provision that, from the wind turbines which are to be preferably shut down and which have a high value for their minimum power limit, the turbine which is to be shut down is selected according to the reading of a shut-down counter which is assigned to the turbine. The shut-down counter of a wind turbine is configured to count and store the number of shut-down processes which the wind turbine has already experienced over its previous life cycle. The counter can preferably be software-implemented. It can be implemented in the control software of each of the individual turbines. Alternatively, a counter function which records the shut-down processes of the individual wind turbines can also be provided in the control software of the wind farm. In this respect, the wind turbine with a low value of its shut-down counter is preferred during activation and shut-down. This additional criterion ensures that when making a selection with the same, or approximately the same, minimum power limit that wind turbine which has not yet been switched off so frequently in the past and whose shut-down counter therefore has a relatively low counter value is preferred. The shut-down of wind turbines on the basis of their minimum power limit is therefore reduced or avoided for wind turbines which have already been shut down frequently in the past. Unequal loading of individual wind turbines by particularly frequent shut-down of a turbine in comparison with other wind turbines is therefore advantageously avoided. Alternatively, the counter can also record activation processes. The activation counter and the shut-down counter should in the normal case only differ from one another by the value one, so that the terms activation counter and shut-down counter can be essentially understood as synonyms, and within the scope of this description they primarily permit better delineation with respect to the operating hours counter described below.

Alternatively or additionally to the reading of the shut-down counter, it is also possible to use an operating hours counter as the basis for the additional criterion. This means that the wind turbine which is to be shut down from the set of wind turbines which are preferably to be shut down and have a large value for their minimum power limit is selected according to the reading of their operating hours counter, wherein wind turbines with a large number of operating hours are preferably selected. According to this criterion there is also provision, similarly to the case of the shut-down counter to distribute the wear occurring on the individual wind turbines as a result of operation as uniformly as possible among the turbines in the wind farm. If two wind turbines both have a high value for their minimum power limit, that wind turbine which has been operated longer in the past and therefore has a higher value on its operating hours counter is shut down. The operating hours counter can be configured to detect load-normalized operating hours. In this context, a registered time period of the operating time, for example, a minute or an hour, is multiplied by a load factor for this time period and summed to form a load-normalized overall operating time. The load factor can be specified in dependence on loads which are registered in a time period or estimated for the time period. Taking into account the loads permits more uniform distribution of the loads occurring at the individual wind turbines over the total number of wind turbines in the wind farm.

It is also possible for the operating hours counter of the wind turbines to be selected as an additional criterion for the selection of the wind turbine which is to be activated from a set of wind turbines which are preferably to be activated and have a low value for their minimum power limit. Accordingly, for the wind turbine which is to be activated that wind turbine which has only run for a low number of operating hours is selected from among those with a low value for their minimum power limit. This selection for wind turbines with a high value for their minimum power limit also contributes to the wind turbines in the wind park being loaded more uniformly with respect to one another when activation occurs. Likewise, load-normalized operating hours can be used as a criterion.

If it is not possible to determine on the basis of the further selection criteria a single wind turbine which is to be preferably shut down or activated, that is, if a minimum power limit and counter readings are similar or the same, an unambiguous termination condition can be specified via which an absolutely clear selection of a wind turbine can be made in any case. For example, the selection can be made on the basis of the static IP addresses of the wind turbines or a predefined numbering of the wind turbines in the wind farm. Therefore, it can be provided as a termination criterion that the wind turbine be shut down or activated with the lowest IP address in the event, for example, of no selection criterion having generated an unambiguous selection. Alternatively there can be provision that the wind turbine with the highest IP address is shut down or activated. By specifying an unambiguous termination condition it is always possible to make a comprehensible selection and a decision is not left to chance. Other termination conditions which unambiguously define a wind turbine are also possible.

With respect to homogenization of the loads of the wind turbines it has proven particularly advantageous to carry out what is referred to as binning, that is, division into classes or intervals. In the case of binning, different values which are close to one another, such as for example different minimum power limits, are combined in power limit intervals. Binning can also be carried out by rounding values for the power limits. For the comparison of the values with one another, an exemplary value from the respective power limit interval is used, via which value the individual wind turbines are sorted. With binning, greater emphasis can be placed on, in particular, the additional criteria for the homogenization of the load in the wind farm. This can be appropriate since the value specified by the minimum power limit is not the sole decisive factor for the loading and wear on the wind turbines. Greater or lesser emphasis is placed on the additional criteria depending on the length of the power intervals in which the minimum power limits are combined.

A particularly advantageous selection of the wind turbines in the case of activation and shut-down in the wind farm can be achieved if the wind turbine is assigned the minimum power limit in dependence on its operating mode. In this assignment, which is carried out in dependence on the current operating mode of the wind turbine, the minimum power limit can also be given a higher setting than the actual status of the wind turbine requires. In this way it is possible to prioritize specific operating modes of the wind turbine in the case of activation and shut-down of the wind turbines. The minimum power limits for the individual operating modes are preferably assigned in dependence on the wind speed and/or the rotational speed, since loads acting on the wind turbine are primarily dependent on the wind speed. It is also possible to take into account the wind direction at the individual wind turbines.

For high wind speeds above a specified limiting speed it is possible to provide for the wind turbines to be limited in their power output in dependence on the wind speed, increasingly as the wind speed rises. In this method, which is referred to as "soft-cut-out" or "storm-fade-out", the power output is reduced until a specified shut-down wind speed is reached. This avoids such wind turbines becoming shut down from operation at the rated power, and therefore avoids large jumps occurring in the power output of the wind farm. Wind turbines which are operated in the soft-cut-out mode can be assigned a higher minimum power limit than technically necessary as the power increases. The higher minimum power limit has the effect that wind turbines which are operated in the soft-cut-out mode are preferred for shut down.

Apart from the operating-mode-dependent assignment of the minimum power limit, the minimum power limit reflects the value of the power of the respective wind turbine above which continuous and stable operation of the wind turbine is possible and the minimum value which is to be fed in by the wind turbine. The minimum power limit therefore itself has a function which permits continuous and stable operation of the wind turbines in the wind farm.

In an embodiment, the method also provides criteria according to which activation or shut-down of wind turbines has to take place. As a criterion for the shut-down of at least one of the wind turbines there can be provision that the sum of the minimum power limits of all the wind turbines which are in the production mode is higher than the power setpoint value specified for the wind farm. This criterion therefore ensures that all the wind turbines which are in the production mode can contribute with a power value which is higher than their minimum power limit. In this respect, this criterion also ensures that none of the wind turbines has to be operated below its minimum power limit.

It can also be provided as a criterion for the activation of a wind turbine that a weighted sum of the minimum power limits of all the wind turbines which are in the production mode and of the minimum power limit of the wind turbine which is to be preferably activated is lower than the power setpoint value which is specified for the wind farm. This criterion ensures that depending on the weighting activation is avoided if owing to the operating conditions of all the turbines in operation it would immediately bring about shut-down of a wind turbine. An unstable control state in which wind turbines are shut down and activated again unnecessarily is therefore prevented from occurring by the weighting factors.

In one development, the weighted sum is higher than a non-weighted addition of the minimum power limits of all the turbines in the production mode and of the minimum power limit of the wind turbine which is to be activated. The weighting of the sum occurs via one or more weighting factors. For better understanding reference is made here to the fact that the addition which is not weighted can have the effect that the power setpoint value of the wind farm is satisfied as far as possible by minimum power limits. Although this would give the wind farm a relatively large control range in the case of a rising power setpoint value for the wind farm, it would greatly limit the possibility of the wind farm reacting to a falling setpoint value, since a falling setpoint value specification would then instantaneously trigger at least one further shut-down. The weighting factors are therefore preferably higher than 1. The weighting factors can preferably be dependent on the wind speed.

The disclosure also relates to a wind farm with a plurality of wind turbines and with at least one control unit which is configured to activate or shut down individual wind turbines in dependence on their respective minimum power limit. In this context, recourse is preferably also made to the method explained above. The explanations which are made with respect to the method therefore also apply correspondingly to the wind farm and to its at least one control unit. The at least one control unit can be a control unit which is superordinate to the wind turbines, for example a wind farm controller. The superordinate control unit can carry out the determination of the setpoint values and transmit them, in particular, to the control units of the individual turbines. The external setpoint values, for example for the power which is to be fed in by the wind farm, can be specified to the superordinate control unit via an interface. The superordinate control unit can alternatively or additionally be configured to determine setpoint values, for example for the power to be fed in. However, it is basically also possible for one or more of the control units of the individual wind turbines to be configured to carry out the method and to execute it in a distributed fashion.

BRIEF DESCRIPTION OF THE DRAWINGS

The invention will now be described with reference to the drawings wherein.

DESCRIPTION OF THE PREFERRED EMBODIMENTS OF THE INVENTION

Unless stated otherwise, identical reference symbols denote identical objects in the text which follows.

Figure 1:
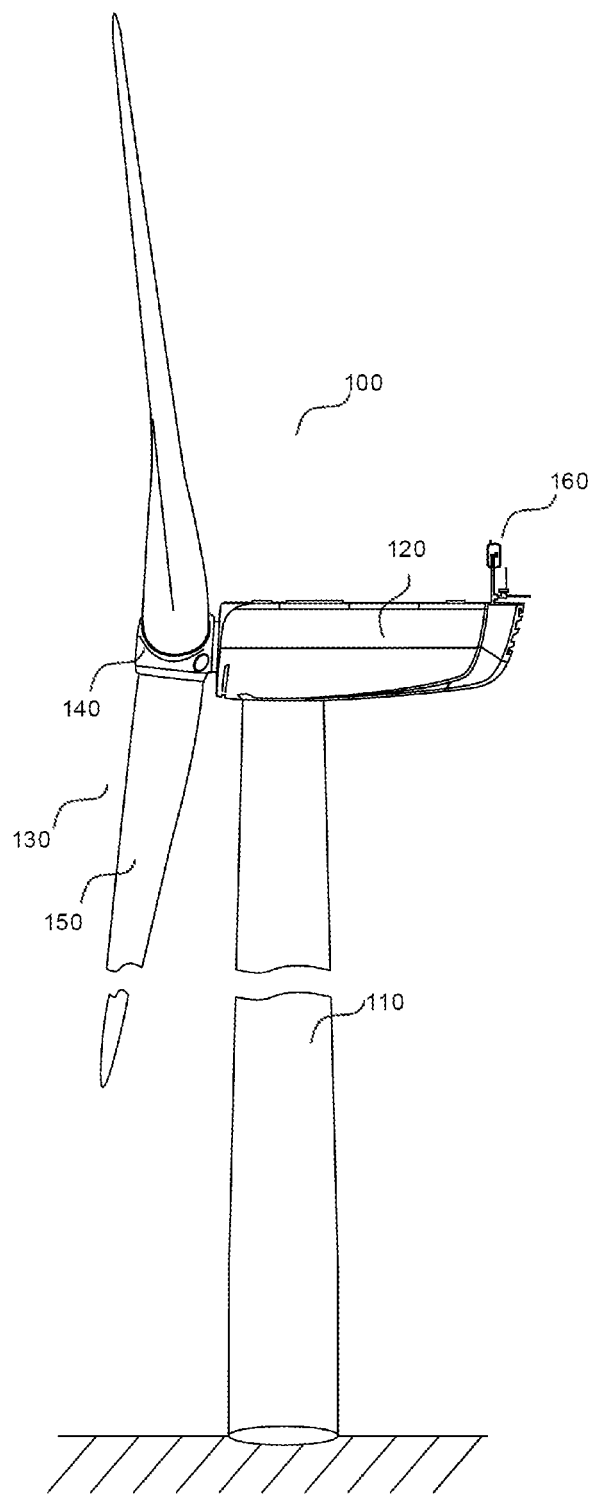
FIG. 1 shows a wind turbine in a side view.

FIG. 1 shows a wind turbine 100, having a tower 110, a nacelle 120 which is rotatably arranged at the upper end of the tower 110, a rotor 130 which is rotatably arranged on the nacelle 120 and has a rotor hub 140 and rotor blades 150 which extend away from the rotor hub 140. In addition, a sensor array 160, which is provided with sensors for measuring the wind speed and the wind direction, is illustrated on the nacelle. The wind turbine 100 is suitable for the method and forms, in particular, part of a wind farm 200, as illustrated in FIG. 2.

Figure 2:
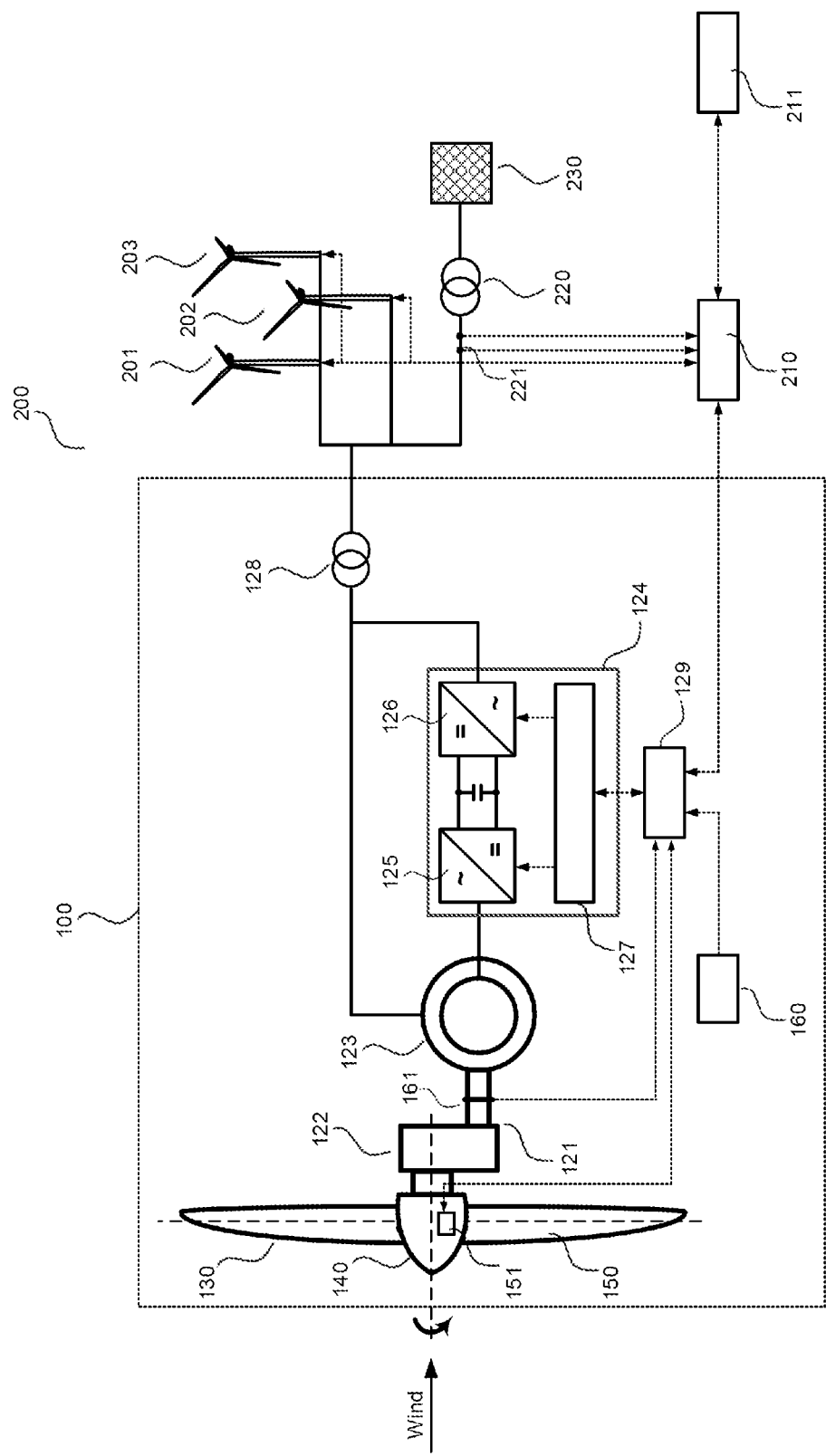
FIG. 2 shows a schematic diagram of a wind farm with a superordinate control unit, wherein the wind turbine from FIG. 1 is part of the wind farm.

FIG. 2 shows overall a wind farm 200, wherein the electrical configuration of the wind turbine 100 is particularly emphasized. In addition, further wind turbines 201, 202, 203 can be seen, and they are all part of the wind farm 200. The wind turbines of the wind farm 200 are connected via a transfer station 220 to a three-phase electrical transmission grid 230 and can feed power into the latter. The wind turbines are each connected to the transfer station 220 and the electrical transmission grid 230 via a medium voltage transformer 128, which is illustrated in FIG. 2 by way of example for the wind turbine 100.

The rotor 130 of the wind turbine 100 picks up torque from the wind and passes it on via a drive train 121, including a transmission 122, to the rotor of a double-fed induction generator 123, which is configured to convert the kinetic energy picked up from the wind into electrical energy and to feed it into the electrical transmission grid 230. The stator of the generator 123 is connected to the electrical supply grid 230 via a three-phase line. The rotor of the generator 123 is connected to an AC converter 124 via a three-phase line. The AC converter 124 is connected on the grid side via a three-phase line to the stator of the generator 123 and the electrical supply grid 230. For the sake of a better overview, electrical lines are illustrated schematically with a single line in FIG. 2.

The AC converter 124 has a rotor-side converter 125 and a grid-side converter 126. A DC link circuit is provided between the converters. A converter controller 127 of the AC converter 124 is configured to set a generator torque by controlling the rotor currents in the rotor of the generator 123, and therefore to set the power which is fed in via the stator circuit. The converter controller 127 of the AC converter 124 is also configured to set the power fed in via the grid-side converter 126. For this purpose, the converter controller 127 can specify command variables for currents, voltages, power levels and/or the generator torque to the rotor-side converter 125 and/or the grid-side converter 126. Reactive variables and/or active variables can be specified for the currents and power levels. Corresponding control methods are generally known for double-fed induction machines. The rotor-side converter 125 sets the rotor currents and therefore the generator torque by switching power electronic components. In order to control the generator torque, the converter controller 127 communicates with a wind turbine controller 129 and receives, in particular, a setpoint value for a generator torque or an active power level which is to be output therefrom.

The wind turbine 100 has a rotational speed sensor 161. The latter can be provided at a location on the drive train 121 which allows the rotational speed of the drive train to be measured, for example at a transmission output shaft which is connected to the rotor of the generator 123. Rotational speed values measured by the rotational speed sensor 161 are present as input variables at the wind turbine controller 129. Furthermore, variables which are registered via the sensors of the sensor array 160 are present at the wind turbine controller 129. For example, the wind speed and the wind direction are present as input variables at the wind turbine controller 129. The nacelle 120 of the wind turbine and therefore its rotor 130 can be oriented with respect to the wind direction via a yaw device (not shown).

The wind turbine controller 129 is also connected to a rotor blade angle positioning device 151 via which the wind turbine controller 129 controls the pitch angles of the rotor blades 150. The wind turbine controller 129 generally serves to control the operation of the wind turbine 100. The wind turbine controller 129 can be embodied, for example, as a programmable logic controller (PLC) and can have software for controlling the wind turbine. For example, the wind turbine controller 129 receives signals and control commands from a wind farm controller 210 with which it communicates via a data line. In the present embodiment, the wind farm controller 210 is configured, as a superordinate control unit, to carry out the method and to provide signals for the control of the wind farm 200 to the individual wind turbines 100, 201, 202, 203 or the wind turbine controllers thereof. In addition to setpoint values, these signals can also include a production permit. The wind farm controller 210 can be embodied, for example, as a programmable logic controller (PLC) and have software for controlling the wind farm. The wind farm controller 210 is connected via a data line to an external control device 211, for example a grid control center and receives therefrom setpoint values for the power to be fed in by the wind farm. The wind farm controller 210 is configured to set the effective power output of the wind farm in dependence on setpoint values from the external control device 211. These setpoint values can be specified, for example, on the basis of an available active power, signaled by the wind farm controller 210 to the external control device 211, of the wind farm and specified for the power demand of the power supply grid and bring about power limitation for the wind farm. Alternatively or additionally to this, the active power setpoint value for the wind farm can be made by the wind farm controller 210 on the basis of measured values which are registered via a sensor unit 221 at or in the vicinity of the grid connection point of the wind farm and which are present as input variables at the wind farm controller 210. For example, the active power setpoint value can be specified on the basis of a measured power grid frequency, the power grid voltage and/or the fed-in reactive power. Corresponding methods are known from the prior art.

Measured values or input values are understood within the scope of this description to be not only actual measured values but, in particular, also variables which have been calculated from the measured values or on the basis of combinations of different values. In this context, variables can also be determined as chronological mean values over a suitable time period. For some values it is also possible to use suitable estimated values as input variables. For example, the wind speed can be determined not only by direct measurement but also as an estimated value from the power, rotational speed and pitch angle.

In respect of the control of the wind farm it is to be noted that any wind turbine which is provided for the production mode has a setpoint value transmitted to it which does not drop below its current minimum active power limit. In the following embodiments, the active power and the active power limit of the individual wind turbines are used as the basis. Of course, it is also possible to select a different electrical variable, such as for example the apparent power or reactive power.

Depending on the power setpoint value which is specified for the wind farm, the situation can occur that individual wind turbines have to be shut down or the releases for production mode have to be withdrawn from them. It may also be necessary to activate individual wind turbines which have been shut down or which do not have a production permit. In order to bring about the best possible controllability for the wind farm, it is necessary to select for shutdown those wind turbines which restrict the controllability of the wind farm to a greater extent than other wind turbines or to activate those wind turbines which limit the controllability of the wind farm to a lesser extent than others. In particular, wind turbines with a high value for their current minimum active power limit restrict the controllability. This is illustrated with an easily accessible example. A wind farm with five wind turbines, the current available power of each of which is approximately 2 MW is to be limited to a setpoint value of 2 MW for the wind farm. Four of the wind turbines have a current minimum active power limit (CMPL=current minimum active power limit) of 400 kW. A fifth wind turbine has a CMPL of 1.5 MW. If the wind turbine with the highest CMPL, that is, the wind turbine with 1.5 MW, is shut down, the wind farm can be controlled in the range from 1.6 MW (4×400 kW) to 8 MW (4×2 MW). If, on the other hand, the wind turbine with the CMPL value of 1.5 MW is not shut down, three wind turbines with their current CMPL of 400 kW must inevitably be shut down. There are then only two of the five turbines remaining in production, meaning that the wind farm would then be controllable in a range from 1.9 MW (=1.5 MW+0.4 MW) to 4 MW. The range in which the wind farm can then be controlled is significantly smaller than the range which results if the wind turbine is shut down with the highest CMPL of 1.5 MW. If the wind farm then receives its new setpoint value of 6 MW, the wind farm can reach the setpoint value only after the start of at least one further wind turbine, meaning that several tens of seconds up to several minutes can pass until the started turbines reach the setpoint value allocated to them. The wind farm with the bigger control range can, on the other hand, reach the new setpoint value of 6 MW within a few seconds. Similar considerations also apply to the activation of wind turbines if the active power which is available in a wind farm is not sufficient for a setpoint value specification because wind turbines are shut down or not in the production mode. In this case it is desirable to select the wind turbines to be activated in such a way that the best possible controllability is ensured for the wind farm. A turbine with a low CMPL value is therefore preferably to be activated.

For better understanding of the invention and the description thereof the following variables are defined:

An individual power setpoint value $SP_j$ is specified for each of the wind turbines j in the wind farm by the wind farm controller 210. The specification can preferably be carried out using the currently available power value of the turbine j. This value will be denoted by $PA_j$. The currently available power value $PA_j$ is continuously transmitted to the wind farm controller by the individual wind turbines or their wind turbine controller. The variable is dependent here on the wind conditions present at the individual wind turbines, but can also depend on other limiting conditions. For example, operating conditions of the wind turbines and their components can be taken into account with respect to mechanical and thermal loads which occur. Limiting conditions such as, for example, operation with reduced sound or operation with a limited rotational speed can be taken into account in the determination of the currently available power value. The wind turbine controller calculates the value for $PA_j$ for its respective turbine and transmits it at regular intervals to the wind farm controller. This can occur, for example, with a cycle of approximately 10 milliseconds.

$CMPL_j$ denotes the current minimum active power limit of the j-th wind turbine. For the sake of better understanding it will be seen that the wind turbine with the index j is also the j-th wind turbine in the wind farm. External setpoint value specifications to the wind turbine are limited in the downward direction by the CMPL value. If a setpoint value below CMPL is assigned to a wind turbine for whatever reasons, this turbine will either raise the setpoint value to the value of CMPL or the wind turbine will shut itself down without this wind turbine having been prioritized. This serves to protect against excessive wear.

The $CMPL_j$ values are preferably usually determined by the individual wind turbines or their controllers and transmitted to the wind farm controller. This can be done, for example, with the same clock cycle in which the wind turbines transmit their available power. Alternatively, a CMPL value can be transmitted by the turbine j only when the $CMPL_j$ value of the j-th wind turbine has changed.

The wind turbine controllers are configured to transmit counter readings required for the execution of the method (activation processes, shut-down processes, operating hours, load-normalized operating hours) to the wind farm controller. The wind farm controller can alternatively also have corresponding counter functions and register the respective counter readings of the individual wind turbines.

The current minimum power limit basically takes into account the configuration of the wind turbine and can, on the basis thereof, also take into account a current operating state and the loads which occur in it and other effects which limit the operation of the wind turbine. For example, limiting conditions for the operation of the transmission of the drive train can act in a dimension-determining fashion on the current minimum active power limit. If a roller bearing is used as a transmission bearing, this can result, for example, in a requirement for a minimum ratio of the rotational speed and torque and consequently for the minimum active power limit, depending on the current rotational speed. Other bearings which are used in the wind turbine, for example for accommodating the main shaft of the wind turbine, can also act in a dimension-determining fashion for the minimum active power limit. Depending on the operating state, radial forces act on the rolling elements of such bearings in their raceways. Operating states which are critical for a roller bearing and which can lead to damage to the bearing are present when, for example, there is only a low torque at the bearing at high rotational speeds. Such a low-load operating state can occur if the wind turbine is operated close to its synchronous rotational speed, for example when starting. However, such an operating mode is to be avoided during normal operation.

Requirements for the avoidance of tooth backlash in the transmission of the wind turbine can also have a limiting effect. For example, brief fluctuations in the torque can bring about damage to the gearwheels in the transmission.

Generally, critical operating states can be taken into account in the control of the wind turbine and be provided as a limiting variable in the determination of the minimum power limit. For example, the torque and therefore the product of the torque and rotational speed can be used for power limitation depending on the rotational speed or the wind speed. In this context, it is also possible to take into account that the rotational speed and torque generally cannot be set in any desired way but rather the operating range can be set in dependence on prevailing wind conditions. The current minimum active power limit can, for example, also be specified in dependence on the current wind direction or turbulence which is occurring. It is also possible to take into account different variables simultaneously. For example, different profiles for the minimum active power limit as a function of the wind speed and as a function of the wind direction are taken into account in the specification of the minimum active power limit.

The minimum active power limit can be specified, for example, in the form of a table, here a look-up table in dependence on at least one actual variable. Alternatively, it is also possible to store functions. The control devices are provided for this purpose with a corresponding memory. The dependence on further variables can be modeled, for example, via further tables, multi-dimensional functions or family parameters. Moving average values, for example a 10-minute mean value of the wind speed, can be used for determining the current minimum active power limit. Likewise, it has proven advantageous with respect to optimal control of the wind farm to define wind speed ranges in which averaging can be carried out over periods of time of different lengths. Look-up tables can also be provided in dependence on an operating mode of the wind turbine.

For a first aspect of the method a wind farm will be provided which includes n>1 wind turbines. The set of indices for the wind turbines will be collated in the set N, wherein the differentiation is made here between the activated wind turbines or wind turbines with a production permit with the index set $N_{on}$ and the index set of the wind turbines $N_{off}$ which can be activated. The case in which the wind farm setpoint value $SP_P$ is lower than the sum of the CMPL values from the wind farm is expressed as a formula as follows:

$$SP_P < \sum_j CMPL_j, j \in N_{on}.$$

In this case, wind turbines are to be taken out of the production mode or shut down until the condition is satisfied that the setpoint value of the wind farm is higher than or equal to the sum of the CMPL values for the wind turbines which are activated in this step or wind turbines with a production permit $N_{on}$. For the sake of a better overview, precise notation of the set of the wind turbines which can be activated or those with a production permit is dispensed with and the set is always denoted as the index set $N_{on}$. Time-related aspects of running the method are also ignored for the time being. This is expressed as a formula as follows:

$$SP_P \geq \sum_j CMPL_j, j \in N_{on}.$$

If the wind farm also includes wind turbines to which a minimum power limit cannot be assigned or to which none is assigned, a CMPL value of zero is assigned to them for the method.

A refinement of this method then provides the following method steps for the selection of the wind turbine or wind turbines to be shut down:
(0) If $SP_P < \Sigma_j CMPL_j$, $j \in N_{on}$, execute the following method steps; WHILE: $SP_P < \Sigma_j CMPL_j, j \in N_{on}$:
(1) Determine the set $N^*_{on}$ of the activated wind turbines or wind turbines with a production permit for which shut-down is currently possible;
(2) Compare the minimum active power limits $CMPL_j$ of the wind turbines which can be currently shut down, and determine the wind turbine/turbines whose CMPL* is highest $$CMPL^* := \max_j CMPL_j, j \in N^*_{on};$$

(3) If precisely one wind turbine k has a highest minimum active power limit ($CMPL_k$=CMPL*), select the wind turbine k and jump to step (7), otherwise continue with step (4);

(4) Compare the shut-down counter readings of the wind turbines whose CMPL value is highest;
(5) If precisely one wind turbine k has a highest minimum active power limit and a minimum shut-down counter reading, select the wind turbine k and jump to step (7), otherwise continue with step (6);
(6) Apply a predefined termination condition and select the wind turbine k which satisfies the absolutely unambiguous termination condition;
(7) Shut down the selected wind turbine k.

The method denoted above with its individual steps is an embodiment of the method according to this disclosure, wherein in this case a shut-down counter of the wind turbines is additionally evaluated in order to be able to resolve a non-unambiguously-defined condition with respect to the maximum of CMPL. Furthermore, an absolutely unambiguous termination condition is tested in order to be able to select a respective individual wind turbine unambiguously for the shut-down in the case of non-unambiguous testing of the shut-down counter readings, for example on the basis of the highest IP address (which is statically specified in the wind farm) or the lowest numbering. In step (4), there can alternatively also be a comparison of the operating hours counter readings. The wind turbine or turbines with a maximum operating hours counter reading is/are then identified. Alternatively, in step (4) a comparison of load-normalized operating hours counter readings can take place.

The step (2) of comparing the minimum active power limit $CMPL_j$ of the wind turbines which can be currently shut down and determining the wind turbine or turbines whose CMPL is highest can include an intermediate step (2') during which binning takes place. In this intermediate step, for example the individual $CMPL_j$ is rounded before the comparison and each wind turbine of the set {N} is assigned a rounded value $CMPL_j'$. Subsequently, the $CMPL_j'$ of the wind turbines are compared and the wind turbine or turbines whose rounded CMPL'* is highest is/are determined. During rounding it is possible to round up or round down. Via the specification of the point at which rounding is to take place it is possible to select to what extent selection rules which follow after step (2) act on the determination of the wind turbine to be shut down. The rounding results in intervals among which the individual CMPL values are distributed, and therefore a form of binning occurs for the values. If the $CMPL_j$ are given, for example, in kilowatts (kW), rounding at the 2nd pre-decimal position would cause significantly more wind turbines to be taken into account in the following steps (3) to (6) than if rounding occurs at the first pre-decimal position or does not occur at all. In the case of rounding up at the 2nd pre-decimal position, three wind turbines with a CMPL' of 600 kW would be selected as to be preferably shut down, from a set of, for example, five wind turbines with $CMPL_j$ of 450 kW, 480 kW, 510 kW, 530 kW and 535 kW, while without binning the wind turbine k would already be unambiguously determined with a $CMPL_k$ of 535 kW, and further selection criteria would not have any relevance. In addition to a rounding method it would also be conceivable to specify intervals and to check whether the $CMPL_j$ value of a wind turbine lies in one of the corresponding ranges. For example, the first value range for CMPL values can be specified from 0 to 200 kW, a second one from >200 kW to 500 kW, a third value range >500 kW to 1000 kW, et cetera. Other subdivisions are also conceivable. In the selection step which follows the binning, the wind turbines which have a $CMPL_j$ value in the highest value range are then taken into account. Basically, binning is also conceivable for the evaluation of counter readings.

Figure 3:
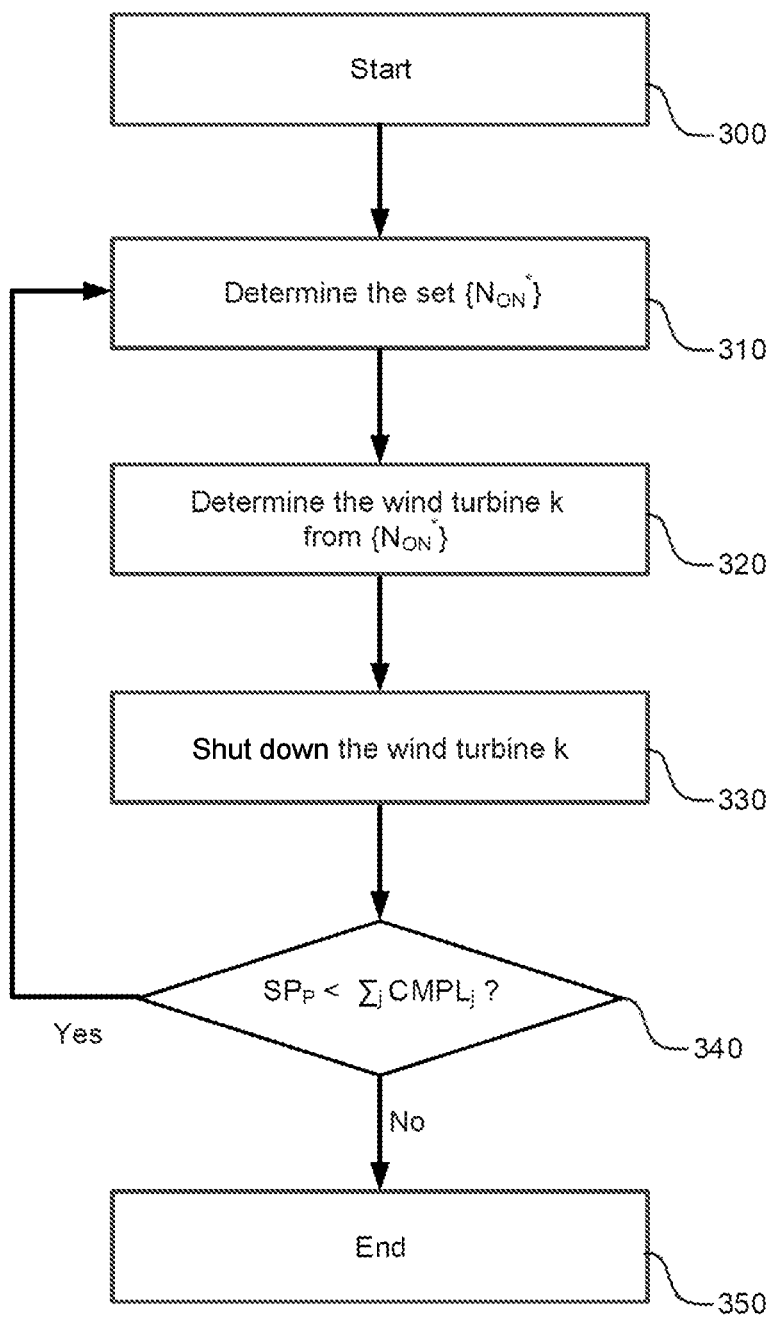
FIG. 3 shows a flow diagram for a method according to the disclosure for the shut-down of a wind turbine.
Figure 4:
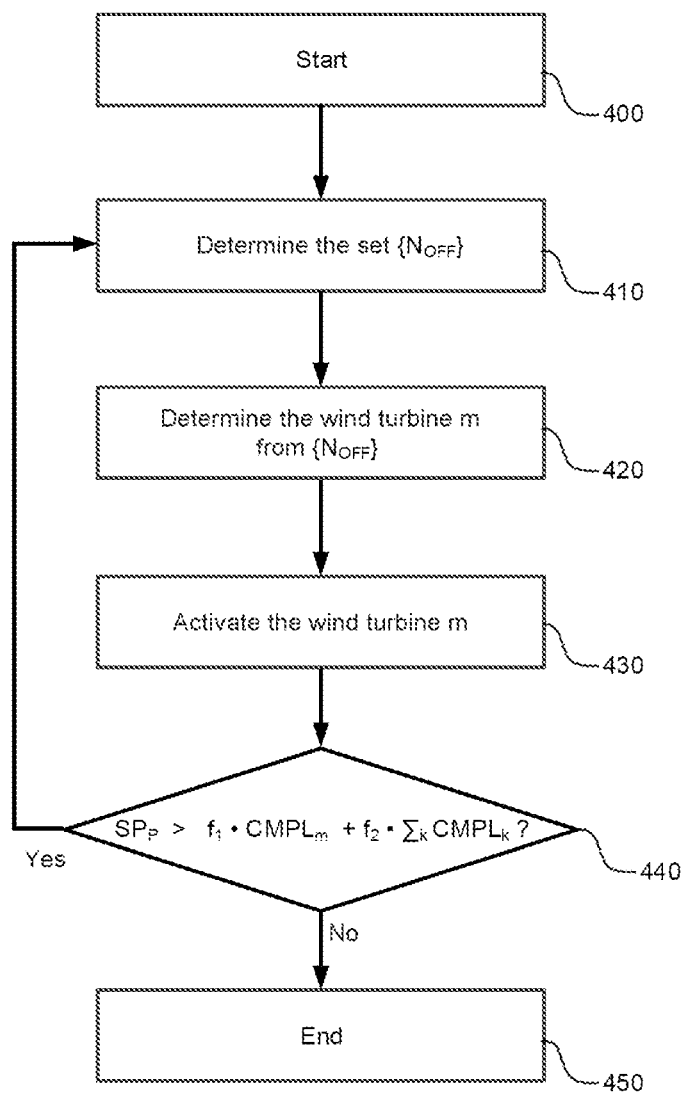
FIG. 4 shows a further flow diagram for the method for the activation of a wind turbine; and, FIG. 5 shows a diagram of the profile of predefined characteristic curves for the minimum power limit, plotted against the wind speed.

A method according to the disclosure is explained with reference to FIGS. 3 and 4. FIG. 3 shows in step 300 the starting process for the method for operating the wind farm. In the starting process 300 it is checked whether $SP_P < \Sigma_j CMPL_j$. If the condition is satisfied, the shut-down of at least one wind turbine is necessary and the process continues with step 310. Step 300 corresponds to the above step (0) in which the starting condition is checked. In step 310, the set of activated wind turbines or wind turbines with a production permit $\{N_{on}^*\}$ whose current operating state permits the wind turbine to be shut down is determined. Step 310 corresponds to the above step (1). From the set $\{N_{on}^*\}$ of the turbines which can be shut down, in step 320 that wind turbine is determined which is preferably to be shut down in comparison with the other wind turbines. In the reduced illustration in FIG. 3 step 320 includes the steps (2) to (6) from the preceding paragraphs of the description. The wind turbine k is therefore determined from the set $\{N_{on}^*\}$ so that for each value of j from the set $\{N_{on}^*\}$ which is unequal to k the wind turbine k is preferably to be shut down in contrast with the wind turbine j. The steps (3) to (6) ensure that the selection is unambiguous and the wind turbine k exists and satisfies the conditions to be checked.

In step 330, the wind turbine k is then shut down. Step 330 corresponds to the step (7) from the preceding paragraphs of the description. In method step 340, it is subsequently checked as a termination condition via the WHILE condition whether the setpoint value $SP_P$ which is specified for the wind farm is higher than or equal to the sum of the CMPL values of the wind turbines which have remained in production mode. If this is the case, the method is ended in step 350. If this is not the case, the method returns to step 310 and a set $\{N_{on}^*\}$ of wind turbines which can be shut down in the wind farm is determined.

$\{N_{on}\}$ can denote here a genuine subset of the set of turbines from the preceding pass, but it is also possible for wind turbines to be added, for example if in the meantime it has become possible to shut down a further wind turbine. Steps 340 and 350 correspond to the WHILE condition of the above description. After the method has been ended in step 350, it can be executed again as soon as the need for the shut-down of wind turbines is present again, for example if a new setpoint value has been transmitted to the wind farm. The method can, however, also be executed cyclically, for example every 1 to 10 seconds.

A further refinement of the method according to the disclosure provides the following method steps for the selection of the wind turbine or wind turbines to be activated:

(0*) If $SP_P > f_2 \Sigma_k CMPL_k$ where $f_2 > 1$: execute the following method steps: WHILE $SP_P > f_1 CMPL_m + f_2 \Sigma_{k, k \neq m} CMPL_k$ where $f_1, f_2 > 1$, $m \in N_{off}$, $M \neq k$:

(1*) Determine the set of wind turbines $N_{off}$ which can be activated;

(2*) Compare the minimum active power limits $CMPL_j$ of the wind turbines which can be currently activated and determine the wind turbine or turbines whose CMPL value is lowest $$CMPL^* := \min_{j \in N_{off}} CMPL_j;$$

(3*) If precisely one wind turbine m has a lowest minimum active power limit ($CMPL_m$=CMPL*), select the wind turbine m and jump to step (7*), and otherwise continue with step (4*);

(4*) Compare the operating hours counter readings of the wind turbines whose CMPL* value is lowest and whose operating hours counter is at a minimum;

(5*) If precisely one wind turbine m has a lowest minimum active power limit and a minimum value for its operating hours counter, select the wind turbine m and jump to step (7*), and otherwise continue with step (6*);

(6*) Apply a specified termination condition and select the wind turbine m which satisfies the absolutely unambiguous termination condition;

(7*) Activate the selected wind turbine m.

The corresponding method for the activation of wind turbines is explained with reference to FIG. 4. The method starts with the step 400. In step 400, it is checked whether $SP_P > f_2 \Sigma_k CMPL_k$ where $f_2 > 1$, that is, the setpoint value specified for the wind farm is higher than the sum of the CMPL values of the wind turbines which are in operation, multiplied by a weighting factor. If the condition is satisfied, the activation of at least one wind turbine is possible and it is advantageous to continue with step 410 in order to improve the control range of the wind farm. Step 400 corresponds to the above step (0*) in which the starting condition is checked. In the following method step 410, the set $\{N_{off}\}$ of the shut-down wind turbines whose current operating state permits activation of the wind turbine is determined. The method step 410 corresponds to the above step (1*). In a subsequent selection step 420, the wind turbine m which is to be preferably activated in comparison with the other wind turbines is determined. In the simplified illustration in FIG. 4 the method step 420 corresponds to the above steps (2*) to (6*). The steps (2*) to (6*) can include intermediate steps in which suitable binning takes place. In the subsequent method step 430, the wind turbine m is activated. This method step 430 corresponds to the above step (7*).

In step 440 it is checked whether the condition $SP_P > f_1 \cdot CMPL_m + f_2 \cdot \Sigma_k CMPL_k$ is satisfied. This method step 440 corresponds to the above WHILE condition. Weighting factors $f_1$ and $f_2$ are specified in the wind farm controller for the steps (0*, 400) and the WHILE condition (440).

The WHILE condition is used to check whether the weighted sum of the minimum power limits of the wind turbines $\Sigma_k CMPL_k$ in the production operation and the minimum power limit $CMPL_m$ of the newly activated wind turbine m is lower than the power setpoint value $SP_P$ specified for the wind farm. Counter to the intuitive assumption that the power setpoint value should be reached by the available power values $PA_j$ of the turbines which are in operation, this condition requests that the setpoint value is to be reached under the assumption that the wind turbines which are in operation only feed in their minimum power. Therefore, as many wind turbines as possible are advantageously changed to the production mode. If a change occurs in the power setpoint value specification for the wind farm, and significantly more power is therefore demanded of the wind farm, the wind turbines which are in the production mode can change their power output more quickly in the direction of the available power in order to meet the increased demand. On the other hand, wind turbines which are not in the production mode must firstly be started, which, depending on the present wind conditions and the configuration of the wind turbines, would result in a significant delay in the provision of additional power. The factors $f_1$ and $f_2$ serve as safety factors and are specified as being greater than 1. This ensures that there is a sufficient reserve between the power setpoint value $SP_P$ and the sum of the minimum power levels of the wind turbines which are in the production mode. This avoids the situation in which after activation of a wind turbine in the case of strong limitation of the wind farm, that is, when the wind turbines of the wind farm are operated near to their minimum power limits, a wind turbine is directly shut down again even though nothing significant has changed in the influencing factors (the external setpoint value, the wind conditions, the operating conditions of the wind turbines). Through suitable selection of the factors it is therefore possible to suppress a hysteresis behavior of the wind farm. The factors can, for example, also be specified via a look-up table depending on the present wind speed, for example on a 10-minute mean value of the wind speed. The fluctuation range, that is, the difference between the maximum and minimum wind speeds over a specified time period can also be taken into account in order to specify the factors. The limitation of the wind farm with respect to its rated power or its available power can also be taken into account. The wind speed measured values can be transmitted to the wind farm controller by a representative wind turbine of the wind farm. Alternatively, measurement can also take place at a measuring mast which is assigned to the wind farm. It is also conceivable to form mean values using a plurality of wind speed values for a plurality of wind turbines of the wind farm. It is also conceivable to use estimated values instead of measured values. Corresponding estimation methods for determining the wind speed from operating variables of wind turbines are known from the prior art. The magnitude of the factor $f_2$ can furthermore also depend on the number of wind turbines in the wind farm.

If in addition to the wind turbine m there are further wind turbines in the starting phase, for example, because they have just been started in an earlier pass of the method, in step 440 or in the WHILE condition, instead of $f_1 \cdot CMPL_m$ the weighted sum of all the wind turbines in the starting phase is taken into account. The use of a factor $f_1$ which can be specified independently of $f_2$ permits different weighting of the minimum power levels of the wind turbines which are to be firstly changed into the normal production mode. The factors can, however, also be selected with equal values for the sake of simplification, in step 440 it is, however, also possible to dispense with differentiation between the turbines which are in the production mode and turbines which have just started. For this the conditions $SP_P > f_2 \cdot \Sigma_k CMPL_k$ can be checked, wherein the summing is carried out over all the turbines, that is, those in the production mode and those which are in the starting phase. If the termination condition 440 is satisfied, the method ends in step 450. If the termination condition is not yet satisfied, the method returns to step 410 and determines a set of wind turbines $\{N_{off}\}$ again. After the method has been ended in step 450, it can be executed again as soon as there is again a need for the activation of wind turbines, for example if a new setpoint value has been transmitted to the wind farm. However, the method can also be executed cyclically, for example every 1 to 10 seconds.

The wind farm controller from the preceding embodiments receives status messages from the wind turbines, the messages indicating whether a wind turbine is able to be activated or shut down at that time. It may not be possible to activate or shut down wind turbines at a particular time for various reasons. For example, the presence of a serious fault which indicates a defect or an unsafe state of the wind turbine can prevent activation. In addition, the wind turbines can communicate to the wind farm controller that activation is currently not possible owing to the ambient conditions present at the wind turbine. For example, an excessively high or an excessively low wind speed can be detected at a wind turbine or there are conditions which indicate (possible) icing of the rotor blades. A fault in the communication between the wind farm controller and the wind turbine can also lead to a situation in which activation is not possible. Furthermore, the wind turbine may have been taken out of the production mode by a service technician for maintenance or testing purposes. In contrast, shut-down may be temporarily not possible or prohibited if a wind turbine is currently in the starting phase, in order to go into the normal production mode. Disrupted communication can also prevent shut-down. Depending on the number and the operating state of the individual wind turbines of the wind farm, the case can occur that no wind turbine can be shut down or activated at a specific point in time. For example, the wind farm can currently be in a starting phase in which the turbines are changed into the normal operating mode. In this case, the selection method can be aborted and/or delayed and executed again at a later point in time.

In one development of this disclosure, the available power $PA_j$ of the wind turbines can also be taken into account in the selection of the wind turbine which is to be shut down or activated. For example, this consideration can take place in the steps 320 or 420, specifically in the steps (4) or (4*). The difference $PA_j-CMPL_j$ between the available power and the minimum power can be taken into account in the selection of the wind turbine or turbines to be preferably shut down and the wind turbine or turbines whose difference is as small as possible can be selected. Via this selection criterion the power range within which the wind farm can be controlled is maximized. The difference $PA_j-CMPL_j$ between the available power and the minimum power can preferably be taken into account in the selection of the wind turbine or turbines to be preferably activated, and the wind turbine or turbines whose difference is as large as possible can be selected. This selection criterion also maximizes the power range within which the wind farm can be controlled. As an alternative to this, the difference between the available power and the minimum power of the wind turbines could also already be taken into account in the steps 310 or 410, that is, the steps (2) or (2*).

Figure 5:
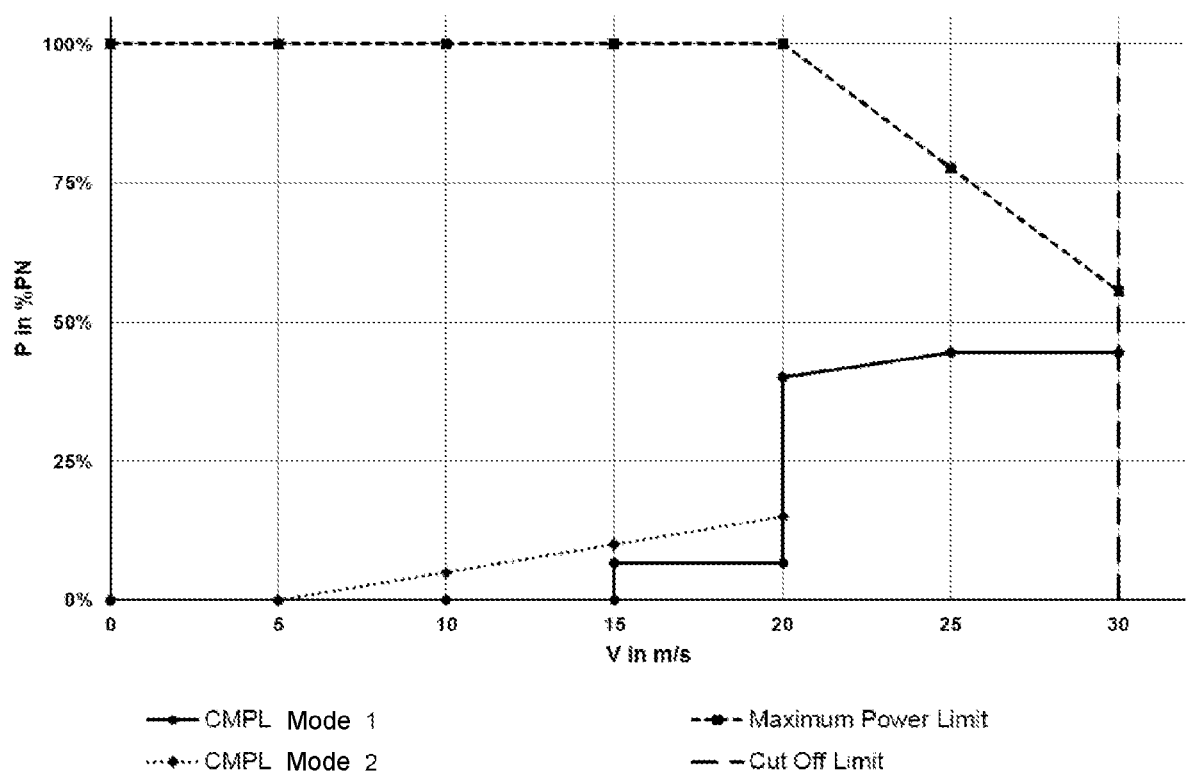

Particular advantages of the method become apparent if the wind turbines are assigned a CMPL value in dependence on their operating mode and the wind speed. FIG. 5 shows a correspondingly implemented example. The two operating modes in FIG. 5 differ in that, for a selected range of the wind speed, CMPL values of differing magnitudes are specified in dependence on the wind speed. An increasing CMPL value which is higher than the CMPL value or its profile which is specified for the mode 1 is illustrated for a wind turbine which is operating in the mode 2, for a wind speed of 5 m/s to 20 m/s. Starting from 20 m/s, the CMPL characteristic curves are the same for both modes. The characteristic curves end at a cut-off wind speed of 30 m/s. The comparatively high value of 30 m/s for the cut-off wind speed is reached in the present example by a power reduction for wind speeds above 20 m/s. Corresponding methods for such a "soft-cut-out" are known in the prior art. While the CMPL value in the range above 20 m/s increases only insignificantly, the active power which is provided by the wind turbine with increasing wind speed drops from a maximum of 100% of the rated power to a value of just below 50%. Depending on the configuration of the wind turbines and operating modes, entirely different profiles than those illustrated here are also possible. The profiles illustrated in FIG. 5 can be specified in dependence on the wind direction. For example, the illustrated profiles can be specified for a specific yaw angle range of the wind turbine. If the wind turbine is oriented with its rotor in this angle range during operation, the corresponding profiles or the look-up tables on which they are based apply. For other angle ranges it is then possible to store further characteristic diagrams in the control system of the wind turbine. The yaw angle corresponding to which the wind turbine is oriented is present in the control device of the wind turbine.

It is understood that the foregoing description is that of the preferred embodiments of the invention and that various changes and modifications may be made thereto without departing from the spirit and scope of the invention as defined in the appended claims.

LIST OF REFERENCE SYMBOLS

100 Wind turbine
110 Tower
120 Nacelle
130 Rotor
140 Rotor hub
150 Rotor blade
160 Sensor array
200 Wind farm
201, 202, 203 Wind turbine
210 Central wind farm controller
211 External control device (power grid operator)
220 Transfer station
221 Sensor unit
230 Electrical transmission grid
121 Drive train
122 Transmission
123 Generator
124 Converter
125 Rotor-side converter
126 Grid-side converter
127 Converter controller
128 Medium voltage transformer
129 Wind turbine controller
151 Rotor blade position device
161 Rotational speed sensor
n Number of wind turbines of the wind farm with production release
{N} Set of wind turbines which can be shut down or set which can be activated
$N_{off}$ Set of wind turbines which are not activated but which can be activated
$N_{on}$ Set of activated wind turbines
$N_{on}*$ Set of wind turbines which can be shut down
k, m Wind turbine which is to be shut down or activated
$SP_j$ Active power setpoint value of wind turbine j
$PA_j$ Currently available active power of wind turbine j
$CMPL_j$ Current minimum active power limit of wind turbine j
$PN_j$ Rated power of wind turbine j
$SP_p$ Setpoint value for the active power to be fed in by the wind farm at the power grid connecting point
$f_1, f_2$ Weighting factors
300-350 Method steps
400-450 Method steps

What is claimed is:

1. A method for operating a wind farm having a plurality of wind turbines, each of which is assigned a minimum power limit ($CMPL_j$), the method comprising:

specifying a power setpoint value ($SP_P$) for a power which is to be fed in for the wind farm;

assigning each wind turbine of the wind farm a current value for its minimum power limit ($CMPL_j$), wherein the current value takes into account at least one of variable operating conditions and ambient conditions of the respective wind turbine; and, activating or shutting down one or more individual ones of the plurality of wind turbines in dependence on the power setpoint value ($SP_P$), wherein said activating and shutting-down of one or more wind turbines in the wind farm takes place in dependence on the respectively assigned minimum power limits ($CMPL_j$).

2. The method of claim 1, wherein from a set of activated ones of the plurality of wind turbines of the wind farm ($N_{on}$), the wind turbine which has a high value for its minimum power limit ($CMPL_j$) compared to the other wind turbines is shut down first.

3. The method of claim 1, wherein from a set of wind turbines of the wind farm which can be activated ($N_{off}$), the wind turbine which has a low value for its minimum power limit ($CMPL_j$) compared to the other wind turbines is activated first.

4. The method of claim 1, wherein the minimum power limit ($CMPL_j$) of each of the plurality of wind turbines of the wind farm specifies a minimum active power value of the wind turbine, and the power setpoint value ($SP_P$) which is assigned to the wind farm is an active power setpoint value.

5. The method of claim 1, wherein if the comparison with the other wind turbines does not unambiguously define the wind turbine which is to be activated or shut down, the method further comprises making a determination according to at least one of the following criteria:
   a. a wind turbine which is to be shut down is selected from the wind turbines with a high value for their minimum power limit, according to the reading of a shut-down counter,
   b. a wind turbine which is to be shut down is selected from the wind turbines with a high value for their minimum power limit, according to the reading of an operating hours counter,
   c. a wind turbine which is to be activated is selected from the wind turbines with a low value for their minimum power limit, according to the shut-down counter, and
   d. a wind turbine which is to be activated is selected from the wind turbines with a low value for their minimum power limit, according to the reading of the operating hours counter.

6. The method of claim 5, wherein for the determination of the highest or the lowest values compared to the other wind turbines, predetermined power intervals are defined within which the values for the minimum power limits are not differentiated.

7. The method of claim 1, wherein the minimum power limit is assigned to the wind turbines depending on their operating mode.

8. The method of claim 1, wherein at least one of the plurality of wind turbines which is in a production mode is shut down if the power setpoint value ($SP_P$) specified to the wind farm is lower than a sum of the minimum power limits of all the wind turbines ($\Sigma_{j \in N_{on}} CMPL_j$) in the production mode.

9. The method of claim 1, wherein at least one of the plurality of wind turbines is activated if the power setpoint value ($SP_P$) specified to the wind farm is higher than a weighted sum of the minimum power limits of all the wind turbines in the production mode ($f_2 \Sigma_{k \in N_{on}} CMPL_k$).

10. The method of claim 9, wherein the weighted sum is higher than a non-weighted addition of the minimum power limits of all the wind turbines in the production mode ($f_2 > 1$).

11. The method of claim 10, wherein the weighting ($f_2 > 1$) for the weighted sum is specified in dependence on the wind speed.

12. The method of claim 10, wherein the weighting ($f_2 > 1$) for the weighted sum is specified in dependence on the wind speed.

13. The method of claim 1, wherein if the comparison with the other wind turbines does not unambiguously define the wind turbine which is to be activated or shut down, the method further comprises making a determination according to at least one of the following criteria:
   a. a wind turbine which is to be shut down is selected from the wind turbines with a high value for their minimum power limit, according to the reading of a shut-down counter, wherein a wind turbine with a low reading of its shut-down counter is selected,
   b. a wind turbine which is to be shut down is selected from the wind turbines with a high value for their minimum power limit, according to the reading of an operating hours counter, wherein a wind turbine with a high number of operating hours is selected,
   c. a wind turbine which is to be activated is selected from the wind turbines with a low value for their minimum power limit, according to the shut-down counter, wherein a wind turbine with a low reading of its shut-down counter is selected, and
   d. a wind turbine which is to be activated is selected from the wind turbines with a low value for their minimum power limit, according to the reading of the operating hours counter, wherein a wind turbine with a low number of operating hours is selected.

14. A wind farm comprising:
a plurality of wind turbines, wherein a minimum power limit ($CMPL_j$) is specified for each of said plurality of wind turbines;
a central control unit configured to have a power setpoint value ($SP_P$) of power which is to be fed in specified; and,
said control unit being configured to activate or shut down said wind turbines in dependence on the power setpoint value ($SP_P$) and in dependence on said minimum power limits ($CMPL_j$) of said wind turbines, wherein each of said plurality of wind turbines of the wind farm is assigned a current value for its minimum power limit, wherein said current value takes into account at least one of operating conditions and ambient conditions of the respective wind turbine in a variable fashion.

15. The wind farm of claim 14, wherein each of said plurality of wind turbines is configured to signal its current minimum power limit ($CMPL_j$) to said control unit.

16. The wind farm of claim 14, wherein:
said plurality of wind turbines includes a set of activated wind turbines ($N_{on}$); said set of activated wind turbines includes a high value minimum power wind turbine having a high value for a corresponding minimum power limit ($CMPL_k$) compared to other ones of said set of activated wind turbines ($N_{on}$); and,
said control unit is configured to shut down said high value minimum power wind turbine first from said set of activated wind turbines ($N_{on}$).

17. The wind farm of claim 14, wherein:
said plurality of wind turbines includes a first set of wind turbines which can be activated ($N_{off}$); said first set of wind turbines includes a low value minimum power wind turbine having a low value for a corresponding minimum power limit ($CMPL_m$) compared to the other wind turbines; and, said control unit is configured to activate first, from the set of wind turbines which can be activated ($N_{off}$), that wind turbine which has a low value for its minimum power limit ($CMPL_m$) compared to other ones of said first set of wind turbines.

\* \* \* \* \*